(12) United States Patent
Cheng et al.

(10) Patent No.: US 7,904,833 B2
(45) Date of Patent: Mar. 8, 2011

(54) ELECTRONIC COMMERCE GUI FOR DISPLAYING TRADING PARTNERS

(75) Inventors: Tsz Simon Cheng, Grand Prairie, TX (US); Brent W. Cossey, Roanoke, TX (US); Gregory P. Fitzpatrick, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 1096 days.

(21) Appl. No.: 10/730,647

(22) Filed: Dec. 8, 2003

(65) Prior Publication Data

US 2005/0125362 A1 Jun. 9, 2005

(51) Int. Cl.
*G06F 3/048* (2006.01)

(52) U.S. Cl. .......... 715/853; 715/713; 715/751; 715/758

(58) Field of Classification Search .................. 715/713, 715/751, 758, 853
See application file for complete search history.

(56) References Cited

U.S. PATENT DOCUMENTS

| | | | |
|---|---|---|---|
| 4,497,057 A | | 1/1985 | Kato et al. |
| 4,698,785 A | | 10/1987 | Desmond et al. |
| 5,491,795 A | * | 2/1996 | Beaudet et al. ............... 715/804 |
| 5,737,727 A | | 4/1998 | Lehmann et al. |
| 5,761,429 A | * | 6/1998 | Thompson .................... 709/224 |
| 5,768,506 A | | 6/1998 | Randell |
| 5,832,455 A | | 11/1998 | Hayashi et al. |
| 5,940,813 A | * | 8/1999 | Hutchings ....................... 705/43 |
| 5,999,910 A | | 12/1999 | Rosenfeld et al. |
| 6,182,052 B1 | * | 1/2001 | Fulton et al. .................... 705/26 |
| 6,219,653 B1 | * | 4/2001 | O'Neill et al. ................ 705/400 |
| 6,496,209 B2 | | 12/2002 | Horii |
| 6,642,946 B1 | * | 11/2003 | Janes et al. .................... 715/854 |
| 7,051,072 B2 | * | 5/2006 | Stewart et al. ................. 709/204 |
| 7,184,973 B2 | * | 2/2007 | Monteleone et al. ........... 705/26 |
| 7,212,996 B1 | * | 5/2007 | Carnahan et al. ........... 705/36 R |
| 2002/0095322 A1 | | 7/2002 | Zarefoss |
| 2002/0147622 A1 | | 10/2002 | Drolet et al. |
| 2002/0156664 A1 | | 10/2002 | Willcox et al. |
| 2002/0171681 A1 | | 11/2002 | Nomura et al. |
| 2002/0173997 A1 | | 11/2002 | Menard et al. |
| 2002/0184065 A1 | | 12/2002 | Menard et al. |
| 2002/0188486 A1 | | 12/2002 | Gil et al. |
| 2002/0194043 A1 | | 12/2002 | Lidow |
| 2003/0033179 A1 | | 2/2003 | Katz et al. |
| 2003/0046289 A1 | * | 3/2003 | Balasubramanian et al. .. 707/10 |
| 2004/0119743 A1 | * | 6/2004 | Xu ................................. 345/760 |

* cited by examiner

*Primary Examiner* — Dennis-Doon Chow
*Assistant Examiner* — Sajeda Muhebbullah
(74) *Attorney, Agent, or Firm* — Novak Druce + Quigg LLP

(57) ABSTRACT

An electronic commerce method can include the step of determining a plurality of e-commerce partners. For each partner, a partner identifier can be presented within a commerce GUI. In the commerce GUI, the partner identifier can be an expandable node. An expansion of at least one of the nodes can be presented within the commerce GUI. For each expansion, a transaction identifier can be presented as a child node of the expanded node. The transaction identifier can represent an electronic commerce transaction between a user of the commerce GUI and the associated e-commerce partner.

15 Claims, 3 Drawing Sheets

ELECTRONIC COMMERCE GUI FOR DISPLAYING TRADING PARTNERS

BACKGROUND

1. Field of the Invention

The present invention relates to the field of computer software and, more particularly, to a graphical user interface for conducting electronic commerce transactions.

2. Description of the Related Art

Electronic commerce transactions involve methods for conducting business that extensively involve the Internet. Electronic commerce can be separated into business-to-business (B2B) transactions and business-to-consumer (B2C) transactions. B2B can refer to the exchange of products, services, or information between businesses. In contrast, B2C transactions can refer to the selling of retail goods on the Internet.

While conventional electronic commerce tools are sufficient to permit business entities to engage in electronic commerce transactions, these tools possess a few shortcomings. One such shortcoming relates to the ability of a business entity to view and manage discrete electronic commerce transactions in real-time or near real-time. For example, when errors occur during electronic commerce transactions, a business entity can have difficulty detecting, tracking, and correcting the errors. Typically, a business entity can search error logs and lengthy reports to determine which attempted transactions processed correctly and which did not. Moreover, even after erroneous transactions have been discovered, the business entity can have difficulty establishing communications with the correct point of contact.

Since by the very nature of electronic commerce, a variety of alternative business entities typically exist, transaction problems can result in a loss of business and/or goodwill. The longer it takes for a business entity to correct a transaction problem, the greater the potential that a loss of business will result. Accordingly, a mechanism is needed that provides business entities engaged in electronic commerce to quickly detect and react to business transaction errors. Ideally, the mechanism would allow a business entity to prioritize different business transactions by importance so that preferential treatment and support can be afforded to key business entities. The ability to react differently to more important business entities can be especially valuable in situations where the administrative personnel that oversee electronic commerce transactions is limited.

SUMMARY OF THE INVENTION

The present invention provides a method, a system, and an apparatus for conducing electronic business. Electronic business can include business-to-business (B2) transactions as well as business-to-consumer (B2C) transactions. More specifically, a commerce graphical user interface (GUI) can present a list of business entities conducting electronic transactions with a GUI user. The GUI can display the business entities in a manner similar to the manner in which online individuals are displayed within a conventional instant messenger GUI. That is, the commerce GUI can display a multitude of expandable nodes, where each node can represent a business entity. When nodes are expanded, the electronic business transactions of an associated business entity can be presented as child nodes of the expanded parent node.

In one embodiment, each child node representing an electronic business transaction can be selected and/or expanded. Selecting a particular transaction can provide details of the transaction. In another embodiment, transaction errors can be displayed as child nodes of the business entity as well, with details available upon selection of the error node. Finally, a communication session, such as an instant messaging session, can be initiated between the user of the commerce GUI and a selected business entity by selecting a communication option within the commerce GUI.

One aspect of the present invention can include an electronic commerce method. The method can include the step of determining a plurality of e-commerce partners. For each partner, a partner identifier can be presented within a commerce GUI. In the commerce GUI, the partner identifier can be presented as an expandable node. When the node is expanded, a transaction identifier can be presented as a child node of the expanded node. The transaction identifier can represent an electronic commerce transaction between a user of the commerce GUI and the associated e-commerce partner. In one embodiment, a transmission error can be detected for an electronic commerce transaction. The transmission error can be presented within said commerce GUI as a child node of an expandable node.

In another embodiment, a selection specifying a node of the commerce GUI can be received. A communication session can be responsively established between a user of the commerce GUI and an e-commerce partner associated with the selected node. For example, an instant messaging session can be established between the GUI user and the selected e-commerce partner. Additionally, a node associated with an electronic commerce transmission and/or an e-commerce partner can be categorized. The node can then be visually differentiated from other nodes based on the category of the node. For example, a node associated with an error transmission can be presented as a blinking red field.

In yet another embodiment, the electronic commerce transaction can include at least one business-to-business (B2B) transaction and the e-commerce partners can include at least one trading partner. Further, a business partner gateway can be provided, where the commerce GUI is an interface for interacting with the business partner gateway. In still another embodiment, the electronic commerce transactions can also include at least one business-to-consumer (B2C) transaction, wherein the e-commerce partners can include at least one consumer.

In a particular embodiment, a determination can be made as to whether each of the e-commerce partners is an active partner or not. Only active partners can be displayed within the commerce GUI. There are a variety of ways that active partnership status can be determined. For example, when a transaction has occurred with the e-commerce partner within a designated time period, the e-commerce partner can be an active partner. In another example, when transactions involving the e-commerce partner exceed a designated threshold, the e-commerce partner can be an active partner. In still another example, active partnership can be based upon whether transactions involving the e-commerce partner exceed a designated data size. Additionally, a preference level for an e-commerce partner can be determined, and active partnership can depend on whether this preference level is above a designated preference level threshold. In a further embodiment, an administrative GUI can be provided to adjust at least one parameter that defines a criteria for determining whether e-commerce partners are active partners.

Another aspect of the present invention can include a system for conducting electronic commerce transactions. The system can include an electronic commerce application and a commerce GUI. The electronic commerce application can conduct electronic commerce transactions between an e-commerce entity and at least one e-commerce partner. The commerce GUI can display electronic commerce transactions in near real time, wherein the displayed electronic commerce transactions can be grouped by e-commerce partner. The electronic commerce application can also include a communication engine and an active engine. The communication engine can establish a communication session between the e-commerce entity and a selected e-commerce partner displayed within the commerce GUI. The commerce GUI can initiate the communication session. The active engine can categorize e-commerce partners as active partners. Additionally, the commerce GUI can limit displayed e-commerce partners to those partners categorized as active partners.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
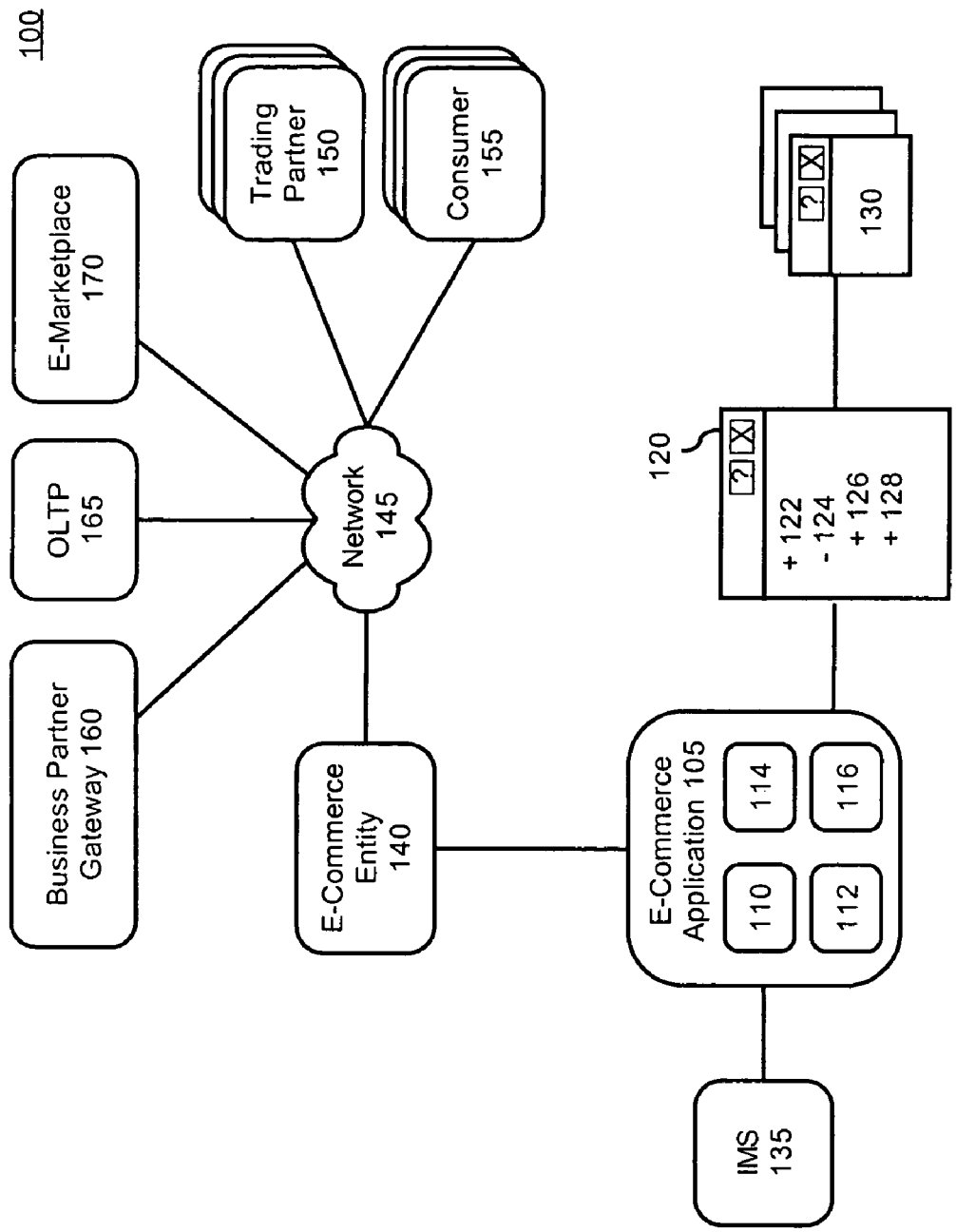
FIG. 1 is a schematic diagram illustrating a system for conducting electronic commerce transactions in accordance with the inventive arrangements disclosed herein.

FIG. 1 is a schematic diagram illustrating a system 100 for conducting electronic commerce (e-commerce) transactions in accordance with the inventive arrangements disclosed herein. The system 100 can include an e-commerce application 105 and a commerce graphical user interface (GUI) 120. The e-commerce application 105 can enable the e-commerce entity 140 to conduct business with e-commerce partners via a communicatively linked network 145, such as the Internet. For example, the e-commerce application 105 can establish a business-to-business (B2B) transaction between the e-commerce entity 140 and a trading partner 150. In another example, the e-commerce application 105 can establish a business-to-consumer (B2C) transaction between the e-commerce entity 140 and a consumer 155.

The GUI 120 can present a list of e-commerce partners conducting electronic transactions with the e-commerce entity 140, where e-commerce partners can include a multitude of trading partners 150 and/or consumers 155, depending upon whether the e-commerce application 105 is a B2B application, a B2C application, or both. The GUI 120 can display the e-commerce partners in an instant messaging fashion by displaying a multitude of expandable nodes within the GUI 120, each node representing an e-commerce partner. In one embodiment, the GUI 120 can reside on both ends of a transaction in order to monitor the transaction using common tools, to provide additional transaction data like contact information, and to facilitate communications.

The GUI 120 can include entity node 122 and entity node 124. When entity node 124 is expanded, transaction node 126 and transaction node 128 and be presented. The transaction node 126 can also be expanded to provide further details concerning the associated transaction. Details can include, but are not limited to, transaction type, amount, time, contact point, outcome, and the like.

Different types of transaction nodes 126 and 128 and different categories entity nodes 122 and 124 can be presented in a visually distinctive fashion. For example, error transaction nodes can be highlighted in red and can be automatically expanded responsive to error detection. In another example, entity nodes representing consumers can be highlighted in blue, while trading partner nodes can be highlighted in green. In yet another example, different icons can precede the labels of different types of nodes.

Additionally, different types of nodes can be separated into different views of commerce GUI 120. For example, all transactions in which errors occur can be presented in one instance of commerce GUI 120, while all transactions that are successfully performed can be presented in another instance of GUI 120. Similarly, when both B2B and B2C transactions are being conducted by the business entity 140, one instance of the GUI 120 can present B2B transactions and a separate instance of GUI 120 can present B2C transactions. Appreciably, a similar separation of functionality can be achieved in a variety of ways using a single interface. For example, a single GUI 120 instance can include a multitude of tabbed views, each view including a separated functionality.

Further, the commerce GUI 120 can be interconnected with a GUI 130. The GUI 130 can perform any of a variety of electronic commerce related tasks. For example, the GUI 130 can provide details for an e-commerce partner selected within GUI 120. In another example, the GUI 130 can also establish a communication session with a designated e-commerce partner. In still another example, the GUI 130 can provide an interface through which the e-commerce entity 140 can configure the e-commerce application 105 and/or the behavior of GUI 120.

The behavior and functionality of the GUI 120 can be controlled by components of the e-commerce application 105, which include an active engine 110, a transaction router 112, a report generator 114, and/or a communication engine 116. The active engine 110 can limit the e-commerce partners presented within GUI 120 to active partners. Whether a partner is active or not can be determined through configurable settings in a variety of manners. These settings can be accessed via GU 130.

In one embodiment, an active partner can be an e-commerce partner with which recent transactions have been conducted. For example, all e-commerce partners that have performed transactions within the last 72 hours can be considered active partners. In another example, only those e-commerce partners with currently pending transactions can be considered active partners. In a particular embodiment, a valuation threshold for a transaction can be established, where only e-commerce partners engaged in transactions exceeding the threshold can be active partners. The size (in bytes) of a transaction can also be used as a threshold that must be met or exceeded before the associated e-commerce partner can be categorized as an active partner. In still another embodiment, an importance threshold can be established for an e-commerce partner and used as a threshold to determine active status. The importance of an e-partner can be established based on such criteria as credit history, transaction history, status in a loyalty program, and the like.

The transaction router 112 can route different transactions to different staff based on a series of configurable rules, which can be adjusted using GUI 130. Highly important e-commerce partners and transactions can be given more attention than more routine partners and transactions. For example, when an important e-commerce partner desires personal assistance, that partner can be advanced to the head of a waiting queue and/or can be instantly connected to particular service personnel. In another example, when an error occurs with a highly profitable transaction, the error can be immediately routed to the most qualified support personnel available.

The report generator 114 can generate any variety of reports for the e-commerce application 105, which can then be presented within the GUI 120 and/or the GUI 130. Reports can include detailed history of a transaction, contact information for an e-commerce partner, transaction error reports, real-time pending transaction reporting, and the like.

The communication engine 116 can establish a communication session between the e-commerce entity 140 and an e-commerce partner. The communication session can be initiated by selecting an e-commerce partner from within the GUI 120 and/or 130. In one embodiment, the communication session can include an instant messaging session. Instant messaging can be particularly convenient when the e-commerce partner also utilizes a commerce GUI like GUI 120, which can include embedded instant messaging capabilities. The communication session that can be established via the communication engine 116 is not, however, limited to instant messaging and any form of communication can be used. For example, the communication session can include, but is not limited to, telephoning, teleconferencing, Web conferencing, co-browsing, Internet chatting, e-mailing, faxing, and the like.

It should be noted that the e-commerce application 105 can transport information between the e-commerce entity 140 and the trading partner 150 and/or the consumer 155 according to a variety of transport protocols using a variety of data formats. Transport protocols supported by the e-commerce application 105 can include, but are not limited to, Hypertext Transfer Protocol (HTTP), Hypertext Transfer Protocol over Secure Socket Layer (HTTP/S), File Transfer Protocol (FTP), Secure FTP, Simple Mail Transfer Protocol (SMTP), Simple Object Access Protocol (SOAP), Web services, and the like. Data formats used by the e-commerce application 105 can include, but are not limited to, Electronic Data Interchange (EDI), Extensible Markup Language (XML), Electronic Business XML (ebXML), Commercial XML (cXML), XML Common Business Library (xCBL), BizTalk, RosettaNet, Chemical XML (chemXML), ANSI X.12, Health Insurance Portability and Accountability Act (HIPAA), Electronic Data Interchange for Administration, Commerce, and Transport (EDIFACT), and the like.

Further, the e-commerce application can enable e-commerce transactions which utilize a business partner gateway 160, an online transaction processing (OLTP) application 165, and/or an e-marketplace 170. A business partner gateway 160 can manage data security and protocol reconciliation for communications between the e-commerce entity 140 and the trading partner 150 and/or the consumer 155. The business partner gateway 160 can include, for example, an application like WebSphere Business Integration—Connect (WBI-C) by International Business Machines, Inc. (IBM) of Armonk, N.Y. The OLTP application 165 can be an application that facilitates and manages transaction-oriented applications, typically for data entry and retrieval. The OLTP application 165 can include, but is not limited to, an application like the Consumer Information Control System (CICS) by IBM. The e-marketplace 170 can be any application facilitating the exchange of goods and/or services between venders and consumers. The e-marketplace 170 can include, for example, a Universal Description, Discovery, and Integration of Web services (UDDI) marketplace, UCCnet, Ebay.com by Ebay, Inc. of San Jose, Calif., Amazon.com by Amazon Inc. of Seattle, Wash., and the like.

The e-commerce application 105 can also be communicatively linked to an information management system (IMS) 135 of an organization. The IMS 135 can include a contact management application, an interactive voice response (IVR) system, a warehousing application, an accounting application, an inventory database, a shipping application, collaboration applications, and the like. Integrating the e-commerce application 105 with suitable data sources and applications can permit the automation and simplification of numerous oft-repeated tasks.

Figure 2:
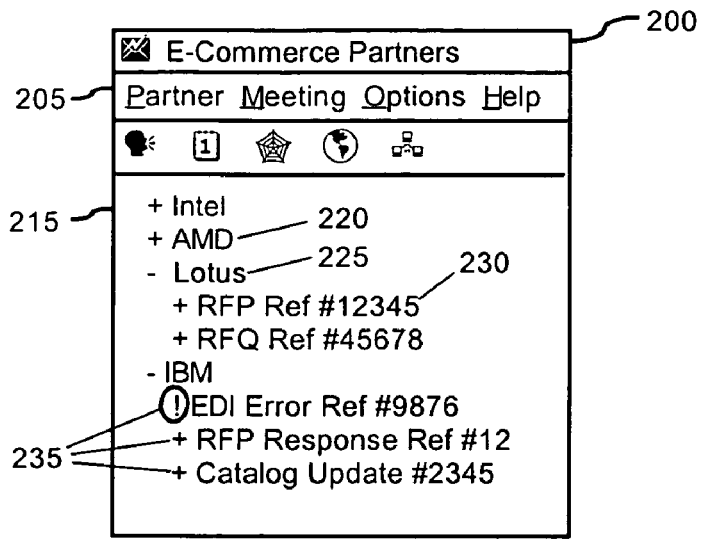
FIG. 2 is an exemplary graphical user interface (GUI) presenting electronic commerce information in accordance with the inventive arrangements disclosed herein.

FIG. 2 is an exemplary GUI 200 presenting electronic commerce information in accordance with the inventive arrangements disclosed herein. The GUI 200 can include a menu bar 205 and an e-commerce partner section 215. The menu bar 205 can include menus for accessing e-commerce partner options including, but not limited to a partner menu, a meeting menu, an options menu, and a help menu.

The e-commerce partner section 215 can present a listing of one or more trading partners and/or consumers. Each e-commerce partner can be represented as an expandable node. For example, node 220 represents the e-commerce partner labeled "AMD" that is not expanded to show transaction details. Node 225 is an expanded node for the e-commerce partner labeled "Lotus." Beneath node 225 are transaction node 230 with reference number 12345 and a transaction node with a reference number 45678. Each transaction node can have an associated icon 235 indicating a transaction type. For example, an error, such as "EDI Error Ref #9876" can be associated with an exclamation point icon 235. Other transaction types can be associated with different icons, such as a plus sign. Transaction types can be grouped according to different categories of goods, according to the status of an e-commerce partner, according to transaction importance levels, and in any other suitable fashion.

Figure 3:
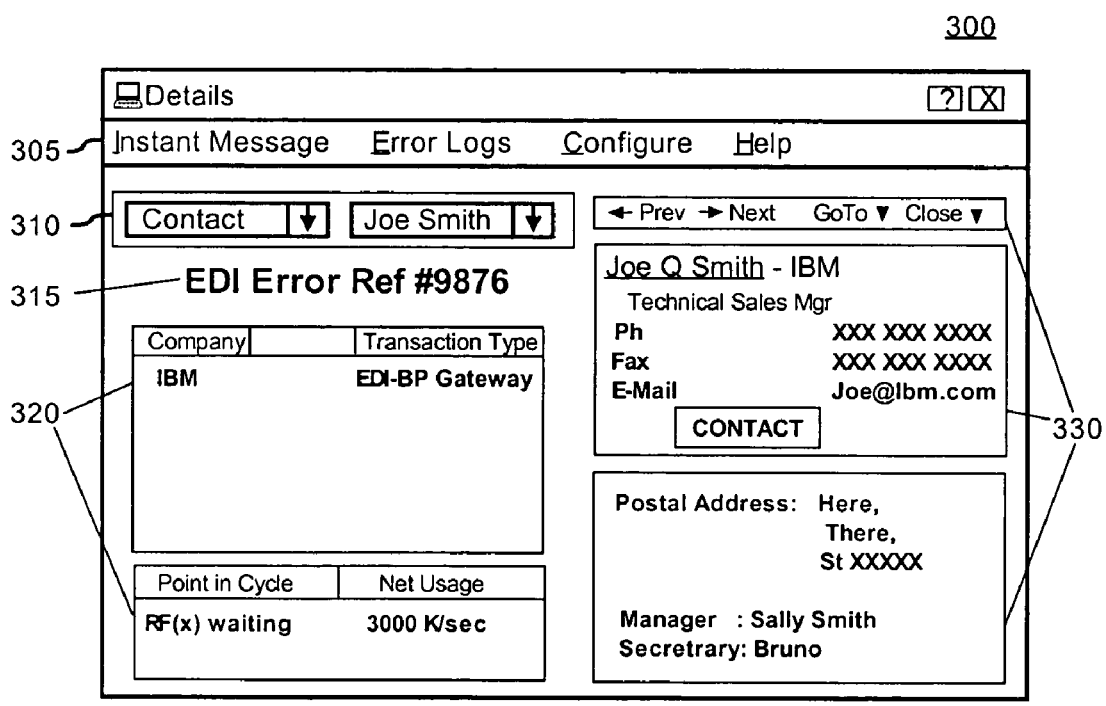
FIG. 3 is an exemplary GUI presenting transaction details in accordance with the inventive arrangements disclosed herein.

FIG. 3 is an exemplary GUI 300 presenting transaction details in accordance with the inventive arrangements disclosed herein. GUI 300 can be initiated from GUI 200 and can provide details for a selected transaction, such as the transaction with reference number 9876. The GUI 300 can include a menu bar 305, a selection filter 310, a key transaction 315, a transaction details section 320, and a contact section 330.

The menu bar 305 can provide a multitude of user selectable menus including, but not limited to, an instant message menu, an error log menu, a configuration menu, and a help menu. The selection filter 310 section can limit the information presented within the GUI 300. For example, when a contact field is selected in the selection filter 310 section, information within the GUI 300 can relate to a designated contact. Alternatively, a company field can be selected in the selection filter section 310 resulting in the presentation of company specific information. Any of a variety of criteria can be established for and displayed within the filter section 310, such as administrator, technician, customer, trading partner, transaction protocol, e-marketplace, OLTP, and the like.

The key transaction 315 can specify the transaction for which data is displayed within GU 300. The transaction overview section 320 can give basic details for the transaction referenced in key transaction 315. When a transaction involves multiple companies and sub-actions, each of these component actions can be listed in the transaction overview section 320. Further, the transaction overview section 320 can show network statistics pertaining to a transaction.

The contact section 330 can include contact information for communicating with an e-commerce partner. For example, the contact section 330 can include name, address, title, telephone number, fax number, e-mail address, supervisor, and the like. The contact section 330 can also provide a means for immediately establishing a communication session with the listed contact point. In one example, the communication session can be automatically established using default settings. In another example, a window can be displayed that prompts a user to select communication settings for the communication session.

It should be noted that the various GUIs disclosed herein are shown for purposes of illustration only. Accordingly, the present invention is not limited by the particular GUI or data entry mechanisms contained within views of the GUI. Further, the functions relating to the various GUI elements of GUI 200 and GUI 300 can be accessed directly through keyboard combinations or hot-keys as well as through a series of mouse interactions and responsively displayed pop-up menus and need not be identified with displayed GUI elements. Rather, those skilled in the art will recognize that any of a variety of different GUI types and arrangements of data entry, fields, selectors, and controls can be used without deviating from the essence of the inventive arrangements disclosed herein.

Figure 4:
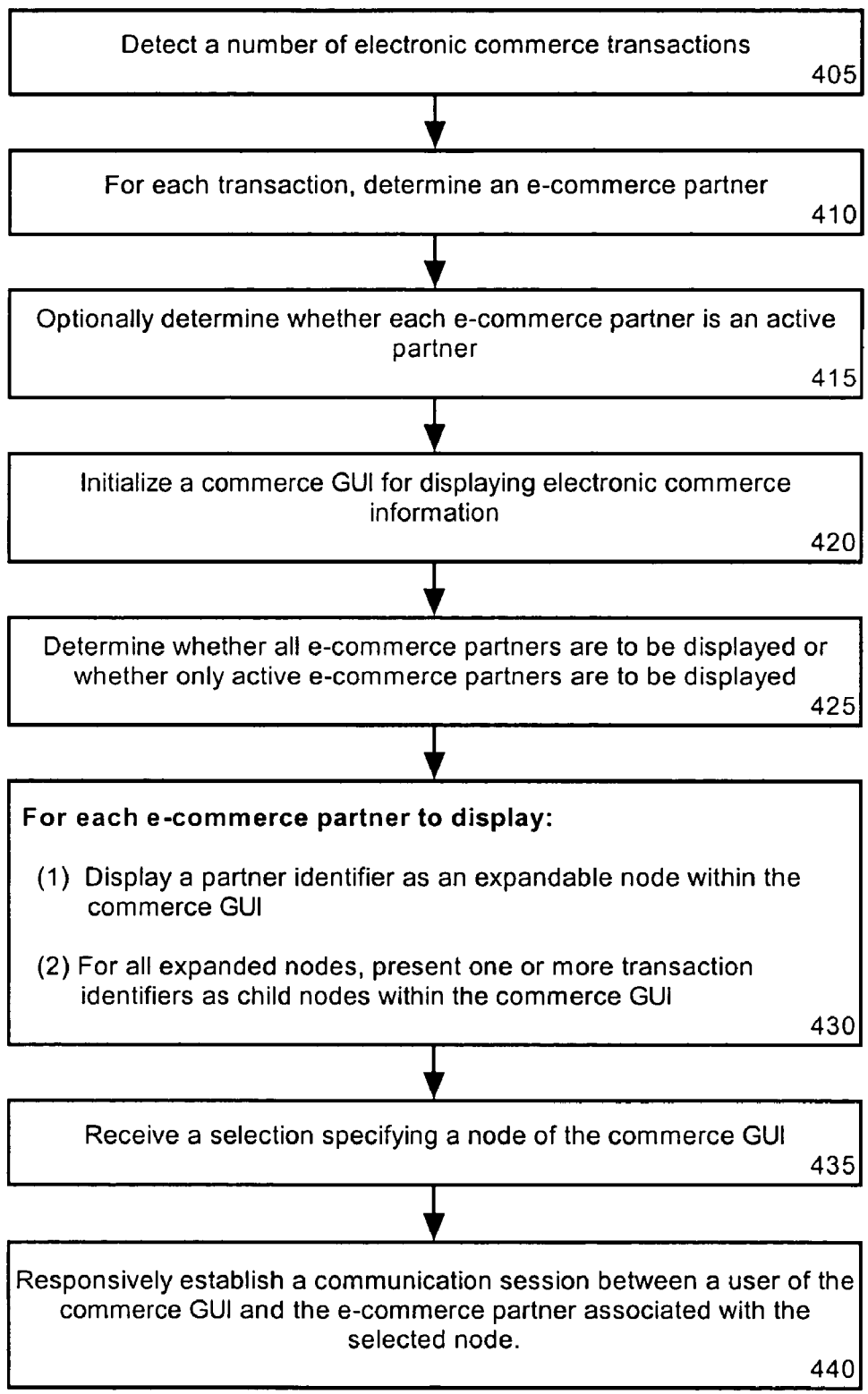
FIG. 4 is a flow chart illustrating a method for conducting an electronic commerce transaction in accordance with the inventive arrangements disclosed herein.

FIG. 4 is a flow chart illustrating a method 400 for conducting an electronic transaction in accordance with the inventive arrangements disclosed herein. The method 400 can be performed within the context of a software system in which a B2B or a B2C transaction is conducted between e-commerce partners. The method can begin in step 405 where, a number of electronic commerce transactions can be detected.

In step 410, an e-commerce partner can be determined for each electronic commerce transaction. In step 415, an optional determination can be made concerning whether each e-commerce partner is an active partner. An active partner can be an e-commerce partner for whom transactional information is to be displayed. The concept of active partnership can be used to prevent clutter. That is, it can be beneficial for criteria to be established so that electronic transaction administrators can focus upon more important transactions and e-commerce partners. Criteria used to determine active partnership can be configured by an administrator, thereby permitting filtering of e-commerce partners according to the administrator's needs.

In step 420, a commerce GUI used for managing electronic commerce transactions can be initialized. In step 425, a determination can be made as to whether all e-commerce partners are to be displayed in the commerce GUI or whether only active e-commerce partners are to be displayed. For example, a user selectable option within the commerce GUI can enable or disable the presentation of inactive commerce partners.

In step 430, a partner identifier can be presented for each e-commerce partner. This partner identifier can be presented as an expandable node within the commerce GUI. When a partner node is expanded, one or more transaction identifiers associated with the e-commerce partner can be displayed. The transaction identifiers can be displayed as child nodes grouped under the parent node that represents the e-commerce partner engaged in the transaction. In step 435, a selection specifying a node of the commerce GUI can be received. Additionally, a command initializing a communication session for the selected node can be received. In response, a communication session can be established between a user of the commerce GUI and the e-commerce partner associated with the selected node. For example, an instant messaging session can be established with a designated contact through a specified communication channel.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of displaying e-commerce partners within an e-commerce system including an e-commerce application and a commerce graphical user interface, the e-commerce application enabling an e-commerce entity to conduct business with e-commerce partners via a communicatively linked network, the method comprising the steps of:

for each of the e-commerce partners automatically determining by an active engine of the e-commerce application whether said e-commerce partner is an active partner based on the following criteria:
  detecting whether a transaction has occurred with said e-commerce partner within a designated time period,
  determining whether transactions involving said e-commerce partner exceed a designated valuation threshold,
  determining whether a transaction involving said e-commerce partner exceeds a designated data size, and
  determining whether said e-commerce partner has a preference level above a designated preference level,
  wherein the corresponding criteria for determining whether an e-commerce partner is an active partner are adjustable;
presenting a list of active e-commerce partners within the commerce graphical user interface, each active e-commerce partner being presented as an expandable partner node;
when the partner node is expanded, presenting at least one transaction node as a child node of said expanded partner node, wherein each transaction node represents an e-commerce transaction between the e-commerce entity and said e-commerce partner;
visually differentiating different types of transaction nodes and different categories of partner nodes, wherein error transaction nodes are highlighted and automatically expanded responsive to an error detection; and
assigning by a transaction router of the e-commerce application responsible personnel to transactions based on predetermined rules, wherein the predetermined rules are adjustable, and wherein most qualified personnel is assigned to most profitable transactions.

2. The method of claim 1, wherein said e-commerce partners include at least one trading partner.

3. The method of claim 2, said method further comprising the step of:
providing a business partner gateway, wherein said commerce graphical user interface is an interface for interacting with said business partner gateway.

4. The method of claim 1, further comprising the step of:
detecting an electronic data interchange (EDI) transmission error; and
indicating within said graphical user interface that an error occurred during an associated transmission.

5. The method of claim 1, further comprising the step of:
receiving a selection specifying a node of said graphical user interface;
responsively establishing a communication session between a user of said commerce graphical user interface and the e-commerce partner associated with said node.

6. The method of claim 5, wherein said communication session is an instant messaging session.

7. The method of claim 5, wherein said establishing step further comprises the steps of:
selecting a communication channel; and
establishing said communication session through said communication channel.

8. A machine-readable non-transitory storage having stored thereon, a computer program having a plurality of code sections, said code sections executable by a machine for causing the machine to perform a method of displaying e-commerce partners within an e-commerce system including an e-commerce application and a commerce graphical user interface, the e-commerce application enabling an e-commerce entity to conduct business with e-commerce partners via a communicatively linked network, the method comprising the steps of:
for each of the e-commerce partners automatically determining by an active engine of the e-commerce application whether said e-commerce partner is an active partner based on the following criteria:
detecting whether a transaction has occurred with said e-commerce partner within a designated time period,
determining whether transactions involving said e-commerce partner exceed a designated valuation threshold,
determining whether a transaction involving said e-commerce partner exceeds a designated data size, and
determining whether said e-commerce partner has a preference level above a designated preference level,
wherein the corresponding criteria for determining whether an e-commerce partner is an active partner are adjustable;
presenting a list of active e-commerce partners within the commerce graphical user interface, each active e-commerce partner being presented as an expandable partner node;
when the partner node is expanded, presenting at least one transaction node as a child node of said expanded partner node, wherein each transaction node represents an e-commerce transaction between the e-commerce entity and said e-commerce partner;
visually differentiating different types of transaction nodes and different categories of partner nodes, wherein error transaction nodes are highlighted and automatically expanded responsive to an error detection; and
assigning by a transaction router of tile e-commerce application responsible personnel to transactions based on predetermined rules, wherein the predetermined rules are adjustable, and wherein most qualified personnel is assigned to most profitable transactions.

9. The machine-readable non-transitory storage of claim 8, wherein said e-commerce partners include at least one trading partner.

10. The machine-readable non-transitory storage of claim 9, said method further comprising the step of:
providing a business partner gateway, wherein said commerce graphical user interface is an interface for interacting with said business partner gateway.

11. The machine-readable non-transitory storage of claim 8, further comprising the step of:
detecting an electronic data interchange (EDI) transmission error; and
indicating within said graphical user interface that an error occurred during an associated transmission.

12. The machine-readable non-transitory storage of claim 8, further comprising the step of:
receiving a selection specifying a node of said graphical user interface;
responsively establishing a communication session between a user of said commerce graphical user interface and the e-commerce partner associated with said node.

13. The machine-readable non-transitory storage of claim 12, wherein said communication session is an instant messaging session.

14. The machine-readable non-transitory storage of claim 12, wherein said establishing step further comprises the steps of:
selecting a communication channel; and
establishing said communication session through said communication channel.

15. A computer-implemented system of displaying e-commerce partners within an e-commerce system including an e-commerce application and a commerce graphical user interface, the e-commerce application enabling an e-commerce entity to conduct business with e-commerce partners via a communicatively linked network, the system:
an active engine for automatically determining, for each of the e-commerce partners, whether said e-commerce partner is an active partner based on the following criteria:
detecting whether a transaction has occurred with said e-commerce partner within a designated time period,
determining whether transactions involving said e-commerce partner exceed a designated valuation threshold,
determining whether a transaction involving said e-commerce partner exceeds a designated data size, and
determining whether said e-commerce partner has a preference level above a designated preference level,
wherein the corresponding criteria for determining whether an e-commerce partner is an active partner are adjustable;
means for presenting a list of active e-commerce partners within the commerce graphical user interface, each active e-commerce partner being presented as an expandable partner node;
means for, when the partner node is expanded, presenting at least one transaction node as a child node of said expanded partner node, wherein each transaction node represents an e-commerce transaction between the e-commerce entity and said ecommerce partner;

means for visually differentiating different types of transaction nodes and different categories of partner nodes, wherein error transaction nodes are highlighted and automatically expanded responsive to an error detection; and a transaction router for assigning responsible personnel to transactions based on predetermined rules, wherein the predetermined rules are adjustable, and wherein most qualified personnel is assigned to most profitable transactions.

* * * * *